3,156,543
STABILIZED ORGANIC MATERIAL
Thomas H. Coffield, Farmington, and Allen H. Filbey, Walled Lake, Mich., assignors to Ethyl Corporation, New York, N.Y., a corporation of Virginia
No Drawing. Filed Nov. 21, 1963, Ser. No. 325,452
2 Claims. (Cl. 44—78)

This invention relates to novel compositions of matter. More particularly this invention deals with organic material stabilized against oxidative deterioration by the inclusion therein of an outstanding antioxidant.

Among the objects of this invention, is to provide novel compositions of matter containing a specific phenolic compound as an oxidation inhibitor. Another object is to provide as a new composition of matter, liquid hydrocarbon fuels stabilized against oxidative deterioration. Other objects will be apparent from the following specification and claims.

The objects of this invention are accomplished by a novel composition of matter comprising organic material normally tending to undergo oxidative deterioration in the presence of air, oxygen or ozone containing a small antioxidant quantity, up to 5 percent, of 3,3'-diisopropyl-5,5' - di - tert - butyl - 4,4' - dihydroxydiphenyl[4,4' - bis (2 - isopropyl - 6 - tert - butylphenol)], which has the formula:

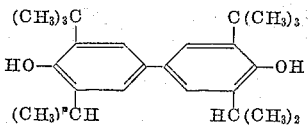

The antioxidant compound of this invention is a light yellow crystalline substance. It is highly soluble in hydrocarbons such as gasoline, diesel fuel, lubricating oil, and the like.

4,4'-bis(2-isopropyl-6-tert-butylphenol) can be prepared by the oxidation of 2-isopropyl-6-tert-butylphenol to 3,3'-diisopropyl-5,5'-di-tert-butyl diphenoquinone which is then reduced to form our novel compound. The oxidation is affected by the use of such oxidizing agents as chromic acid, nitric acid, ferric chloride, or the like. Reduction is accomplished by the use of such reducing agents as stannous chloride, ferrous chloride, zinc and acetic acid, or the like.

The following example, in which all parts and percentages are by weight, illustrates the two-step preparation of the compound of this invention.

EXAMPLE I

Step (1).—In a reaction vessel equipped with stirring and heating means and refluxing apparatus are placed 10 parts of 2-isopropyl-6-tert-butylphenol, 40 parts of ferric chloride hexahydrate, 100 parts of ethanol, and 500 parts of water. This mixture is heated to reflux and emulsified with rapid stirring for 3 hours. At the end of this time, the stirring is stopped, the temperature reduced to about 25° C., and the organic material removed by extraction with ether. The ether extract is dried over sodium sulfate and evaporated to give 3,3'-diisopropyl-5,5'-di-tert-butyl-diphenoquinone.

Step (2).—3,3' - diisopropyl-5,5'-di-tert-butyldiphenoquinone (2 parts) is dissolved in refluxing glacial acetic acid (50 parts). To this is added in small portions powdered zinc. When the solution becomes colorless, the zinc is removed by filtration and the solution is poured into 200 parts of ice water. The white solid which precipitates is recovered by filtration, washed with water, and crystallized from a 25.75 percent water-ethanol solution. 4,4'-bis(2-isopropyl-6-tert-butylphenol) is formed and, when subjected to chemical analysis, corresponds to the empirical formula $C_{26}H_{38}O_2$.

EXAMPLE II

Sixty parts of 2-isopropyl-6-tert-butylphenol were dissolved in 375 parts of ethylene glycol monoethyl ether. Forty-six parts of bromine were added with stirring at room temperature over a 15 minute period. The temperature rose to about 80° C. On cooling, the deep purple crystalline diphenoquinone precipitated. It was filtered off and transferred to 524 parts of boiling glacial acetic acid. Zinc metal (powder) was added in small increments until the solution turned pale yellow. This solution was filtered hot and diluted with 2,000 parts of cold water precipitating a finely divided solid suspended in a yellow oil. The material was extracted with ether, water washed, stripped and recrystallized from an isooctane ether mixture to give 19.3 parts of 4,4'-bis(2-isopropyl-6-tert-butylphenol).

4,4'-bis(2-isopropyl - 6 - tert - butylphenol) finds important utility as an antioxidant in a wide variety of oxygen sensitive materials. Thus, the addition of small quantities of our compound, to such materials as turbine, hydraulic, transformer, or other highly refined industrial oils; waxes, elastomers including natural rubber, crankcase lubricating oils; soaps and greases; plastics; and organometallic compositions such as tetraethyllead and tetraethyllead antiknock fluids; and the like greatly increases their resistance to deterioration in the presence of oxygen, air, or ozone. The amounts so employed are dependent upon the nature of the material to be protected and the condition to be encountered. Generally speaking, amounts in the order of about 0.001 to about 2 percent by weight of the material to be protected are satisfactory. In some applications, up to 5 percent of the compound can be profitably employed.

The compound of this invention is also very effective as an antioxidant for high molecular weight hydrocarbon polymers, such as polyethylene, polystyrene, polyisobutylene, polybutadiene, isobutylene - styrene copolymers, methyl rubber, polybutene rubber, natural rubber, butyl rubber, GR–S rubber, GR–N rubber, piperylene rubber, dimethyl butadiene rubber and the like.

4,4'-bis(2-isopropyl-6-tert-butylphenol) is also useful in protecting petroleum wax—paraffin wax and microcrystalline wax—against oxidative deterioration. The compound of this invention also finds use in the stabilization of edible fats and oils of animal or vegetable origin which tend to become rancid, especially during long periods of storage because of oxidative deterioration. Typical representatives of these edible fats and oils are linseed oil, cod liver oil, castor oil, soybean oil, rapeseed oil, cocoanut oil, olive oil, palm oil, corn oil, sesame oil, peanut oil, babassu oil, butter, fat, lard beef tallow, and the like.

4,4'-bis(2-isopropyl-6-tert-butylphenol) is an excellent antioxidant when dissolved in liquid hydrocarbon fuels, particularly aviation gasoline. In particular, outstanding results are achieved when 4,4'-bis(2-isopropyl-6-tert-butylphenol) is added to aviation gasoline containing an alkyllead antiknock agent.

To illustrate the pre-eminence of our novel compound as an antioxidant, a series of standard oxygen stability tests is conducted employing a representative gasoline normally susceptible to deterioration in the presence of oxygen, air or ozone. These tests involve the addition of 4 milligrams of a compound to be tested to each 100 milliliters of gasoline which is then subjected to conditions conducive to the absorption of oxygen.

The absorption of oxygen by hydrocarbon fuels is measured directly by the standard method of the American Society for Testing Materials for the determination of the oxidation stability of gasoline (induction method) ASTM designation: D525–46, as fully described in Part III-A, ASTM Standards for 1946. According to this method, the induction period is the period during which there is no drop in pressure, indicating no absorption of oxygen, when the test material is placed in a testing bomb maintained at a temperature of 100° C. with an initial pressure of 100 pounds p.s.i. gauge of oxygen.

U.S. Patent No. 2,785,188 discloses 4,4'-bis(2,6-di-tert-butylphenol) as an inhibitor for gasoline. In Example V of that patent a test is described in which gasoline containing the compound was exposed to air for 17 days. A determination of the peroxide number of the gasoline showed relatively little change in comparison to gasoline containing no inhibitor. In order to show the superiority of the compound of this invention as a gasoline antioxidant tests were conducted comparing the compound of this invention with the gasoline inhibitor of the above patent. The test used is described in the paragraphs that follow. In brief, the stability of the gasoline is determined by weighing the amount of precipitate formed upon the subjected sample to 100 p.s.i. of oxygen at a temperature of 100° C. for 16 hours. This gives a direct measurement of the stability of the gasoline, whereas a determination of the peroxide number is only an indirect measurement.

Three samples of a commercially available aviation alkylate base stock gasoline containing 4.6 ml. of tetraethyllead per gallon with one theory of ethylene dibromide were subjected to the 16 hour accelerated aging bomb test at 100° C. and 100 p.s.i. of oxygen. The fuel had an initial evaporation point of 110° F., a 90 percent evaporation temperature of 244° F. and a final evaporation temperature of 358° F. The test procedure employed was taken from ASTM Test Method D–873–57T. This test is designed to measure the storage stability of an aviation fuel by determining the amount of precipitate formed in an accelerated aging test at elevated temperature. The relative degree of stability is determined by measuring the amount of precipitate formed during the test. A description of the test method is available in ASTM Standards on Petroleum Products and Lubricants, page 344 (1957). One of the test samples contained no added antioxidant while the second sample contained an amount of 4,4'-bis(2-isopropyl-6-tert-butylphenol) equal to 4.2 lbs. of antioxidant per 1,000 bbls. of the fuel. The third sample contained an amount of 4,4'-bis(2,6-di-tert-butylphenol) equivalent to an antioxidant concentration of 4.2 lbs. per 1,000 bbls. The results of these tests are summarized in Table I.

*Table I*

| Additive | Concentration | Ptp. (mg./100 ml.) |
|---|---|---|
| 1. None | None | 195 |
| 2. 4,4'-Bis(2,6-di-tert-butylphenol) | 4.2 | 179 |
| 3. 4,4'-Bis(2-isopropyl-6-tert-butylphenol) | 4.2 | 6 |

From Table I it is seen that the uninhibited fuel produced 195 mg. of precipitate during the 16 hour aging test. However, when treated with 4,4'-bis(2-isopropyl-6-tert-butylphenol), the compound of this invention, only 6 mg. of precipitate were formed. On the other hand, treatment of the fuel with an equal concentration of 3,3',5,5'-tetra-tert-butyl-4,4'-dihydroxydiphenyl produced 179 mg. of precipitate. Thus, the 3,3',5,5'-tetra-tert-butyl-4,4'-dihydroxydiphenyl had very little beneficial effect on the amount of precipitate formed. In distinction to this, our compound almost completely eliminated precipitate from the gasoline tested, there being only 6 mg. of precipitate formed.

An inspection of the data in Table I shows that 4,4'-bis(2,6-di-tert-butylphenol) reduced the amount of precipitate from that formed in the uninhibited fuel by only 16 mg., whereas 4,4'-bis(2-isopropyl-6-tert-butylphenol) reduced the amount of precipitate by 189 mg. In other words, 4,4'-bis(2-isopropyl-6-tert-butylphenol) is 11.8 times as effective in reducing precipitate formation as is 4,4'-bis(2,6-di-tert-butylphenol). Thus, a benefit of about 1180 percent is achieved by replacing the equivalent amount of 4,4'-bis(2,6-di-tert-butylphenol) with 4,4'-bis-(2-isopropyl-6-tert-butylphenol).

The following examples, in which all parts are by weight, are illustrative specific examples of the use of the novel compound of this invention in organic material normally tending to deteriorate in the presence of air.

EXAMPLE III

To 1000 parts of a liquid hydrocarbon fuel having 39.1 percent paraffins, 21.0 percent olefins, 17.1 percent aromatics and 22.8 percent naphthenes, an initial evaporation temperature of 88° F. and a final evaporation temperature 426° F. is added 1 part of 4,4'-bis(2-isopropyl-6-tert-butylphenol). The mixture is agitated to dissolve the 4,4'-bis(2-isopropyl-6-tert-butylphenol) in the fuel, and the resulting composition is extremely resistant to oxidative deterioration.

EXAMPLE IV

To 1000 parts of a gasoline having 44.0 percent paraffins, 17.9 percent olefins and 38.1 percent aromatics, an initial evaporation temperature of 94° F. and a final evaporation temperature of 119° F. is added 10 parts of 4,4'-bis(2-isopropyl-6-tert-butylphenol). The mixture is agitated to dissolve the 4,4'-bis(2-isopropyl-6-tert-butylphenol). The resulting fuel has an excellent stability to oxidative deterioration.

EXAMPLE V

An aviation gasoline (grade 80) containing 0.49 milliliter of tetraethyllead per gallon and 1.0 theory of ethylene dibromide and having an initial boiling point of 118° F., a 90 percent evaporation point of 244° F., an endpoint of 299° F., and an API gravity of 67.9° is blended with 0.02 percent of 4,4'-bis(2-isopropyl-6-tert-butylphenol) to give a highly stable fuel.

EXAMPLE VI

One thousand parts of a grade 91/98 aviation gasoline containing 4.60 milliliters of lead per gallon as tetraethyllead and 1.0 theory of bromine as ethylene dibromide and which has an initial boiling point of 120° F., an endpoint of 328° F. and an API gravity of 62.8°, is added 5 parts of 4,4'-bis(2-isopropyl-6-tert-butylphenol).

EXAMPLE VII

Ten thousand parts of a grade 100/130 aviation gasoline are blended with 200 parts of 4,4'-bis(2-isopropyl-6-tert-butylphenol). The gasoline contains 2.87 milliliters of tetraethyllead per gallon and one theory of bromine as ethylene dibromide, has an initial boiling point of 107° F., a 50 percent evaporation point of 212° F., an endpoint of 332° F. and an API gravity of 73.0°.

EXAMPLE VIII

To 5000 parts of a liquid hydrocarbon fuel having 49.7 percent paraffins, 22.3 percent olefins and 28.0 percent aromatics, an initial evaporation temperature of 81° F. and a final evaporation temperature of 410° F. is added 25 parts of 4,4'-bis(2-isopropyl-6-tert-butylphenol). The fuel is agitated to dissolve the mixture. The resulting fuel is stable to oxidative deterioration.

EXAMPLE IX

To 2,700,000 parts of the fuel described in Example VIII is added 3000 parts of lead as tetraethyllead, 0.5 theory bromine as ethylene dibromide, 1.0 theory of chlorine as ethylene dichloride and 27 parts of 4,4'-bis(2-isopropyl-6-tert-butylphenol). The mixture is agitated until a homogeneous oxygen stable solution of all the ingredients is achieved.

EXAMPLE X

To 1000 parts of a commercially available diesel fuel having a cetane number of 51.7 and a 50 percent evaporation temperature of 509° F. is added 3 parts of 4,4'-bis(2-isopropyl-6-tert-butylphenol). The resulting fuel is stable to oxidative deterioration.

EXAMPLE XI

To 1000 parts of a kerosene-type liquid hydrocarbon fuel having an initial evaporation temperature of 325° F. and a final evaporation temperature of 585° F. is added 6 parts of 4,4'-bis(2-isopropyl-6-tert-butylphenol). The mixture is agitated until a homogeneous oxygen stable solution of the ingredients is achieved.

EXAMPLE XII

To an antiknock fluid composition which is to be used as an additive to gasoline and which contains 61.5 parts of tetraethyllead, 17.9 parts of ethylene dibromide and 18.8 parts of ethylene dichloride is added with agitation 2 parts of 4,4'-bis(2-isopropyl-6-tert-butylphenol). The resulting composition is stable for long periods when exposed to air.

Excellent results are also obtained when a gasoline to which the above antiknock fluid is added is subjected to periods of storage. Furthermore, the antioxidant of this invention is valuable when used with antiknock fluids or fuels containing other organometallic substituents.

EXAMPLE XIII

The resistance to oxygen of a natural rubber tire-tread formulation having an initially poor resistance to oxidative deterioration and which is composed of 100 parts of smoked sheet, 45 parts of carbon black, 5 parts of zinc oxide, 3 parts of stearic acid, 3 parts of sulfur and 0.65 part of mercapto-benzothiazole is greatly improved by mixing therewith 5 parts of 4,4'-bis(2-isopropyl-6-tert-butylphenol).

EXAMPLE XIV

To 1000 parts of polyethylene produced by oxygen catalyzed reaction under a pressure of 20,000 atmospheres and having an average molecular weight of 40,000 is added and mixed 5 parts of 4,4'-bis(2-isopropyl-6-tert-butylphenol) as an antioxidant.

EXAMPLE XV

Two parts of 4,4'-bis(2-isopropyl-6-tert-butylphenol) are blended with 10,000 parts of lard. The resulting protected lard is stable over long storage periods in contradistinction to the unprotected product.

EXAMPLE XVI

To 5000 parts of olive oil is added 1 part of 4,4'-bis(2-isopropyl-6-tert-butylphenol) and the mixture is agitated to produce a homogeneous blend which is stable to oxidative deterioration for a long period.

EXAMPLE XVII

To a complex calcium base lubricating grease consisting of 81.2 percent of SAE 20 mineral base oil having a viscosity index of 40 and a viscosity at 100° F. of 300 Saybolt Universal 25 seconds (SUS), 12 percent of 12-hydroxy stearic acid, 2.5 percent of boric acid and 4.3 percent of lime is added and mixed 1 percent of 4,4'-bis(2-isopropyl-6-tert-butylphenol) based on the weight of the grease.

EXAMPLE XVIII

A lithium containing grease is prepared by admixing 150 parts of hydrogenated fish oil fatty acid having a titer of 54, 25 parts of palm oil, 25 parts of naphthenic acid, 40 parts of acetic acid, 700 parts of Coastal pale oil having a viscosity of 100 SUS at 100° F., 80 parts of lithium hydroxide and 800 parts of Coastal red oil having a viscosity of 2000 SUS at 100° F. This mixture is heated to 425° F., cooled by panning and milled. To this grease is blended 10 parts of 4,4'-bis(2-isopropyl-6-tert-butylphenol).

EXAMPLE XIX

To 100 parts of melted paraffin wax having a viscosity of 40 SUS at 210° F. is added 2 parts of 4,4'-bis(2-isopropyl-6-tert-butylphenol).

EXAMPLE XX

To 100 parts of melted microcrystalline wax having an average molecular weight of about 500 and a melting point of 156° F. is added 0.5 part of 4,4'-bis(2-isopropyl-6-tert-butylphenol).

EXAMPLE XXI

To an additive-free 95 VI solvent refined SAE–10 crankcase lubricating oil is added 2 percent of 4,4'-bis(2-isopropyl-6-tert-butylphenol) to compound a lubricating oil effectively inhibited against oxidative deterioration in service.

The above examples illustrate compositions of this invention which possess greatly enhanced resistance to oxidative deterioration by virtue of the presence therein of 4,4'-bis(2-isopropyl-6-tert-butylphenol). The amounts of 4,4'-bis(2-isopropyl-6-tert-butylphenol) employed are dependent upon the nature of the material to be protected and the conditions to be encountered. Generally speaking, amounts in the order of about 0.001 to about 5 percent by weight of the material to be protected can be used. However, in most instances where the material to be protected does not have an unusual oxidative instability, amounts up to about 7 percent are satisfactory.

In order to demonstrate the superior properties of the compositions of this invention, the following gasoline stability test was conducted.

Three samples of a commercially available aviation alkylate base stock gasoline containing 4.6 ml. of tetraethyllead per gallon with one theory of ethylene dibromide were subjected to the 16 hour accelerated aging bomb test at 100° C. and 100 p.s.i. of oxygen. The fuel had an initial evaporation point of 110° F., a 90 percent evaporation temperature of 244° F. and a final evaporation temperature of 358° F. The test procedure employed was taken from ASTM Test Method D–873–57T. This test is designed to measure the storage stability of an aviation fuel by determining the amount of precipitate formed in an accelerated aging test at elevated temperature. The relative degree of stability is determined by measuring the amount of precipitate forme during the test. A description of the test method is available in ASTM Standards on Petroleum Products and Lubricants, page 34 (1957). One of the test samples contained no added antioxidant while the second sample contained an amount of 3,3'-diisopropyl-5,5'-di-tert-butyl-4,4' - dihydroxydiphenyl equal to 4.2 lbs. of antioxidant per 1,000 bbls. of the fuel. The third sample contained an amount of 3,3',5,5'-tetra-tert-butyl-4,4'-dihydroxydiphenyl equivalent to an antioxidant concentration of 4.2 lbs. per 1,000 bbls. The results of these tests are summarized in the following table:

| Additive | Concentration | Ptp. (mg./100 ml.) |
|---|---|---|
| 1. None | None | 195 |
| 2. 3,3',5,5'-tetra-t-butyl-4,4'-dihydroxydiphenyl | 4.2 | 179 |
| 3. 3,3'-diisopropyl-5,5'-di-t-butyl-4,4'-dihydroxydiphenyl | 4.2 | 6 |

From the table it can be seen that the uninhibited fuel produced 195 mg. of precipitate during the 16 hour aging test. However, when treated with 3,3'-diisopropyl-5,5'-di-tert-butyl-4,4'-dihydroxydiphenyl, only 6 mg. of precipitate were formed. On the other hand, treatment of the fuel with an equal concentration of 3,3',5,5'-tetra-tertbutyl-4,4'-dihydroxydiphenyl produced 179 mg. of precipitate. Thus, the 3,3',5,5'-tetra-tert-butyl-4,4'-dihydroxydiphenyl had very little beneficial effect on the amount of precipitate formed. In distinction to this 3,3'-diisopropyl-5,5'-di-tert-butyl-4,4' - dihydroxydiphenyl almost completely eliminated precipitate from the gasoline tested, there being only 6 mg. of precipitate formed.

An inspection of the data shows that 3,3',5,5'-tetratert-butyl-4,4'-dihydroxydiphenyl reduced the amount of precipitate from that formed in the uninhibited fuel by only 16 mg., whereas 3,3'-diisopropyl-5,5'-di-tert-butyl-4,4'-dihydroxydiphenyl reduced the amount of precipitate by 189 mg. In other words, 3,3'-diisopropyl-5,5'-ditert-butyl-4,4'-dihydroxydiphenyl is 11.8 times as effective in reducing precipitate formation as is 3,3',5,5'-tetratert-butyl-4,4' - dihydroxydiphenyl. Thus a benefit of about 1180 percent is achieved by replacing the equivalent amount of 3,3',5,5'-tetra-tert-butyl-4,4'-dihydroxydiphenyl with 3,3'-diisopropyl-5,5'-di-tert-butyl-4,4' - dihydroxydiphenyl.

This application is a continuation-in-part of application Serial No. 94,971, filed March 13, 1961, which, in its turn is a continuation-in-part of application Serial No. 779,296, filed December 10, 1958, now abandoned, which in its turn is a division of application Serial No. 495,788, filed March 21, 1955, now U.S. Patent No. 2,900,417.

We claim:

1. As a new composition of matter, a liquid hydrocarbon fuel tending to undergo oxidative deterioration containing 0.001 to about 2 percent of 4,4'-bis(2-isopropyl-6-tert-butylphenol).

2. Gasoline normally susceptible to deterioration in the presence of oxygen containing from about 0.001 to about 1 percent by weight of 3,3'-diisopropyl-5,5'-ditert-butyl-4,4'-di-hydroxydiphenyl, having the formula:

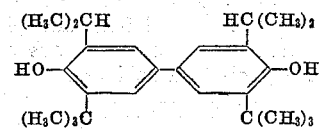

References Cited in the file of this patent

UNITED STATES PATENTS

| | | |
|---|---|---|
| 2,479,948 | Luten et al. | Aug. 23, 1949 |
| 2,785,188 | Coe | Mar. 12, 1957 |

FOREIGN PATENTS

| | | |
|---|---|---|
| 687,293 | Great Britain | Feb. 11, 1953 |